US009391793B2

(12) United States Patent
Trahan et al.

(10) Patent No.: US 9,391,793 B2
(45) Date of Patent: Jul. 12, 2016

(54) ELECTRONIC PLACARD

(71) Applicant: Trahan Tech Inc., St-Jean-sur-Richelieu (CA)

(72) Inventors: Philippe Trahan, St-Jean-sur-Richelieu (CA); Louis Trahan, St-Jean-sur-Richelieu (CA)

(*) Notice: Subject to any disclaimer, the term of this patent is extended or adjusted under 35 U.S.C. 154(b) by 244 days.

(21) Appl. No.: 14/068,223

(22) Filed: Oct. 31, 2013

(65) Prior Publication Data

US 2014/0126574 A1 May 8, 2014

Related U.S. Application Data

(60) Provisional application No. 61/721,635, filed on Nov. 2, 2012.

(51) Int. Cl.
| | | |
|---|---|---|
| *H04L 12/18* | (2006.01) | |
| *G08G 1/087* | (2006.01) | |
| *H04W 40/38* | (2009.01) | |

(52) U.S. Cl.
CPC ............ *H04L 12/1895* (2013.01); *G08G 1/087* (2013.01); *H04L 12/1845* (2013.01); *H04L 12/1854* (2013.01); *H04W 40/38* (2013.01)

(58) Field of Classification Search
None
See application file for complete search history.

(56) References Cited

U.S. PATENT DOCUMENTS

| | | | |
|---|---|---|---|
| 5,621,571 A | 4/1997 | Bantli et al. | |
| 6,510,378 B2 | 1/2003 | Olindo et al. | |
| 6,985,090 B2 | 1/2006 | Ebner et al. | |
| 7,859,431 B2 | 12/2010 | Peddies et al. | |
| 7,890,126 B2 | 2/2011 | Benco et al. | |
| 7,936,284 B2 | 5/2011 | Levine et al. | |
| 8,150,612 B2 | 4/2012 | Nagase et al. | |
| 2004/0212582 A1* | 10/2004 | Thielemans | G09F 9/30 345/107 |
| 2005/0280555 A1 | 12/2005 | Warner. IV | |
| 2006/0056368 A1* | 3/2006 | Ratiu | G06F 3/147 370/338 |
| 2010/0249341 A1 | 9/2010 | Sato et al. | |
| 2013/0022245 A1* | 1/2013 | Sivertsen | G08G 1/07 382/104 |
| 2013/0113618 A1 | 5/2013 | Flanagan et al. | |

FOREIGN PATENT DOCUMENTS

| | | |
|---|---|---|
| EP | 2226780 | 9/2010 |
| WO | WO 0063771 | 10/2000 |

OTHER PUBLICATIONS

Dragan Samardzija et al. "Road Nail: Intelligent Road Marking System Testbed" University of Novi Sad Novi Sad, Serbia.

* cited by examiner

*Primary Examiner* — Khoa Huynh
(74) *Attorney, Agent, or Firm* — Benoit & Cote, Inc.

(57) ABSTRACT

A system for displaying updated traffic information such as parking, detours, road blockage etc. in a given area. The system comprises a network of placards connected to a central station. Each placard has a unique identification within the network. The central station sends a message word to one of more placards and each placard receives and propagates the received message word to adjacent placards in the network in a point-to-multipoint configuration. The message word includes an encoded traffic message that only the designated placards may decode and display. In an embodiment, the encoded message may only be decoded using the unique identification of the designated placards.

11 Claims, 8 Drawing Sheets

ELECTRONIC PLACARD

CROSS-REFERENCE TO RELATED APPLICATIONS

This application claims priority from U.S. provisional patent application No. 61/721,635 filed on Nov. 2, 2012 the specifications of which are hereby incorporated by reference.

BACKGROUND (a) Field

The subject matter disclosed generally relates to an electronic placard for providing updated information to the public.

(b) Related Prior Art

Traffic placards are usually provided at an elevated position e.g., secured to light polls or walls, to be seen by pedestrians and drivers. Traffic placards usually indicate local traffic rules for a certain area, street or a portion of a street. Examples of conventional traffic placards are shown in FIGS. 1a and 1b.

These placards often include confusing information when it comes to parking and speed. For example, in school areas the placards may indicate that the speed is 40 km/h from Monday and Friday between 7 AM and 4 PM, and 80 KM/H outside of these times. This information is confusing and takes time to read, analyze and process especially when someone is driving.

Some placards may indicate that parking is not permitted in a specific time frame of the day between December and April for snow removal operations. However, sometimes it snows earlier than December and/or later than April. In which case, it would not be possible to clean the sidewalks due to the presence of parked cars. In other times, there may not be snow for a long period, but yet drivers may be prohibited from parking to not be ticketed.

Furthermore, depending on snow precipitations, snow removal operations may be performed according to schedules which are determined on a daily basis. Therefore, parking may be prohibited in certain areas during given periods whereas parking is normally allowed in such areas during such given periods. In such cases, temporary traffic placards as shown in FIGS. 1c & 1d are used. Such temporary traffic placards must be produced, and manually installed and removed each time such snow removal operations take place.

Accordingly, there is a need in the market for electronic placards which may be controlled centrally to display up-to-date traffic information.

SUMMARY

The present embodiments describe such electronic placards.

In one aspect, there is provided an electronic placard comprising: a display; a memory having recoded thereon an address representing a unique identification of the placard in a network of placards; a transceiver adapted to receive a message word including for receiving up-to-date an encoded traffic information message from a central station over said network of placards and wirelessly propagate propagating the received traffic information to other adjacent placards in a point-to-multipoint configuration; and a controller adapted to attempt decoding the message word using the unique identification to extract the traffic message, and if successfully extracted send the extracted message to the display for overriding a previously displayed message.

In another aspect, there is provided a system for displaying updated traffic information in a given location, said system comprising: a plurality of electronic placards, each placard being provided in a specific location and having a unique identifier, wherein each placard comprises a transceiver for receiving and re-transmitting received data to adjacent placards, and a display for displaying traffic messages; a central station adapted to encode and send a message word including updated traffic information designated to selected electronic placards over a telecommunications network; wherein each placard re-transmits the received message word to adjacent placards in a point-to-multipoint configuration; and wherein the traffic message is encoded in the message word such that only the designated placards may decode the message and display it.

In a further aspect, there is provided an electronic placard for displaying updated traffic information in a given area, the placard comprising: a chassis that is dimensioned to be portable; an attachment for attaching said chassis to an elevated structure for making the placard visible to pedestrians and drivers; an electronic display; a memory having recoded thereon an address representing a unique identification of the placard in a network of placards; a transceiver adapted to receive a message word including an encoded traffic message from a central station over said network of placards and wirelessly propagate the received traffic information to adjacent placards in a point-to-multipoint configuration; and a controller adapted to attempt decoding the message word using the unique identification to extract the traffic message for overriding a previously displayed message, whereby updated traffic messages are sent to designated placards in the given area.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

A system for displaying updated traffic information such as parking, detours, road blockage etc. in a given area. The system comprises a network of placards connected to a central station. Each placard has a unique identification within the network. The central station sends a message word to one of more placards and each placard receives and propagates the received message word to adjacent placards in the network in a point-to-multipoint configuration. The message word includes an encoded traffic message that only the designated placards may decode and display. In an embodiment, the encoded message may only be decoded using the unique identification of the designated placards.

Figure 1A:
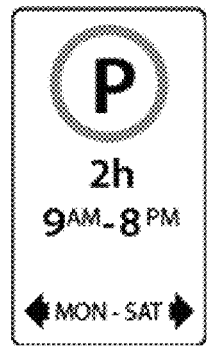
FIGS. 1a, 1b, 1c & 1d illustrate examples of conventional traffic placards.
Figure 1B:
Figure 1C:
Figure 1D:
Figure 2:
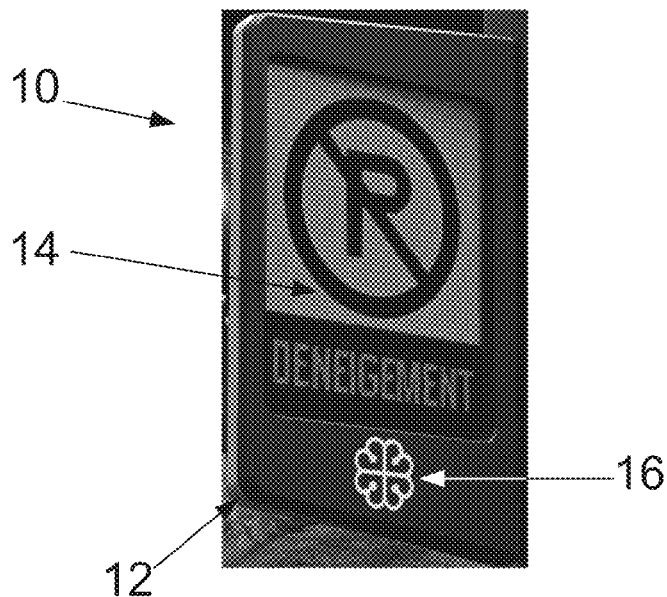
FIG. 2 illustrates an image of an electronic placard in accordance with an embodiment.

FIG. 2 illustrates an image of an electronic placard in accordance with an embodiment. As shown in FIG. 2, the electronic placard 10 comprises a chassis 12 and a display 14 for displaying up-to-date traffic messages to the public. In the example of FIG. 2, the message indicates that parking is prohibited due to snow removal. The chassis may also include a logo/trademark/sign 16 of the city in which the placard 10 is used to indicate that the placard 10 displays official traffic information. Traffic information is provided to the placard 10 from a central location as will be described in further detail hereinbelow.

In an embodiment, the placard 10 may include two displays for displaying identical or different traffic information on the different displays 14. Assuming that the electronic placard 10 is used in a one-way street, the placard 10 may display the one-way sign on one display and the wrong-way sign on the opposite display to alert drivers in the opposite direction they are going the wrong way. According to another embodiment, a placard 10 may divided in two functional halves on the same display 14 or two displays may be integrated on the same side of the electronic placard 10. Each display (or half) may be controlled individually. One may be a simple on/off display with a "Parking" or "No Parking" sign and the other may be a dynamic display showing the time of day or other dynamic information.

Figure 3:
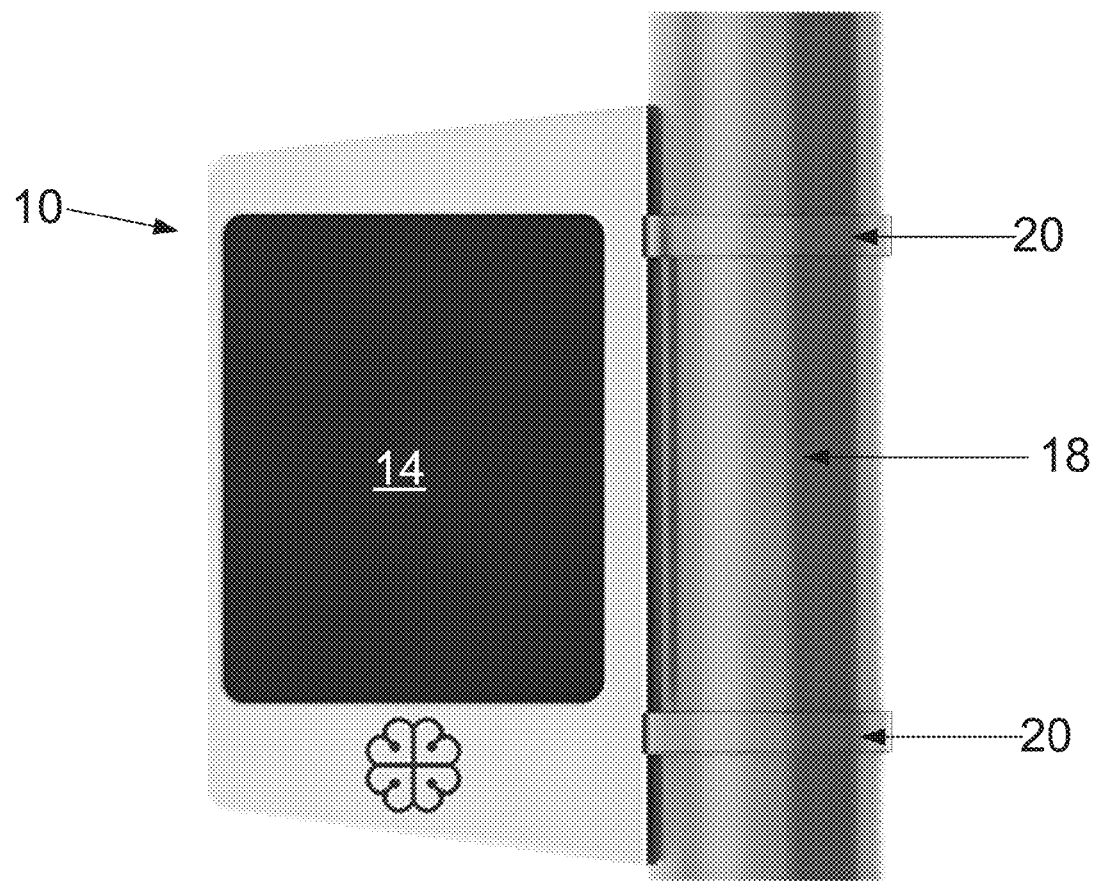
FIG. 3 illustrates an example of an electronic placard secured to a light pole.

FIG. 3 illustrates an example of an electronic placard 10 secured to a light pole 18 using attachments 20, in a non-limiting exemplary implementation. The placard 10 may be provided in a portable size and may include a chassis comprising an attachment 20 in the form of a circular clamp for clamping on a pole 18. In a non-limiting example of implementation the placard 10 may have dimensions that are similar to those illustrated in FIG. 3.

In an embodiment, the electronic placards 10 are provided in different locations of the city/street and connected in the form of a mesh network. In an embodiment, each placard 10 receives the traffic information and propagates it to other adjacent placards 10 within the network in a point-to-multipoint configuration, as exemplified in FIG. 4. One of the advantages of such configuration is that if one link breaks or one placard 10 is damaged, the information can still make its way to the designated placard(s) through other placards 10 within the network.

Figure 4:
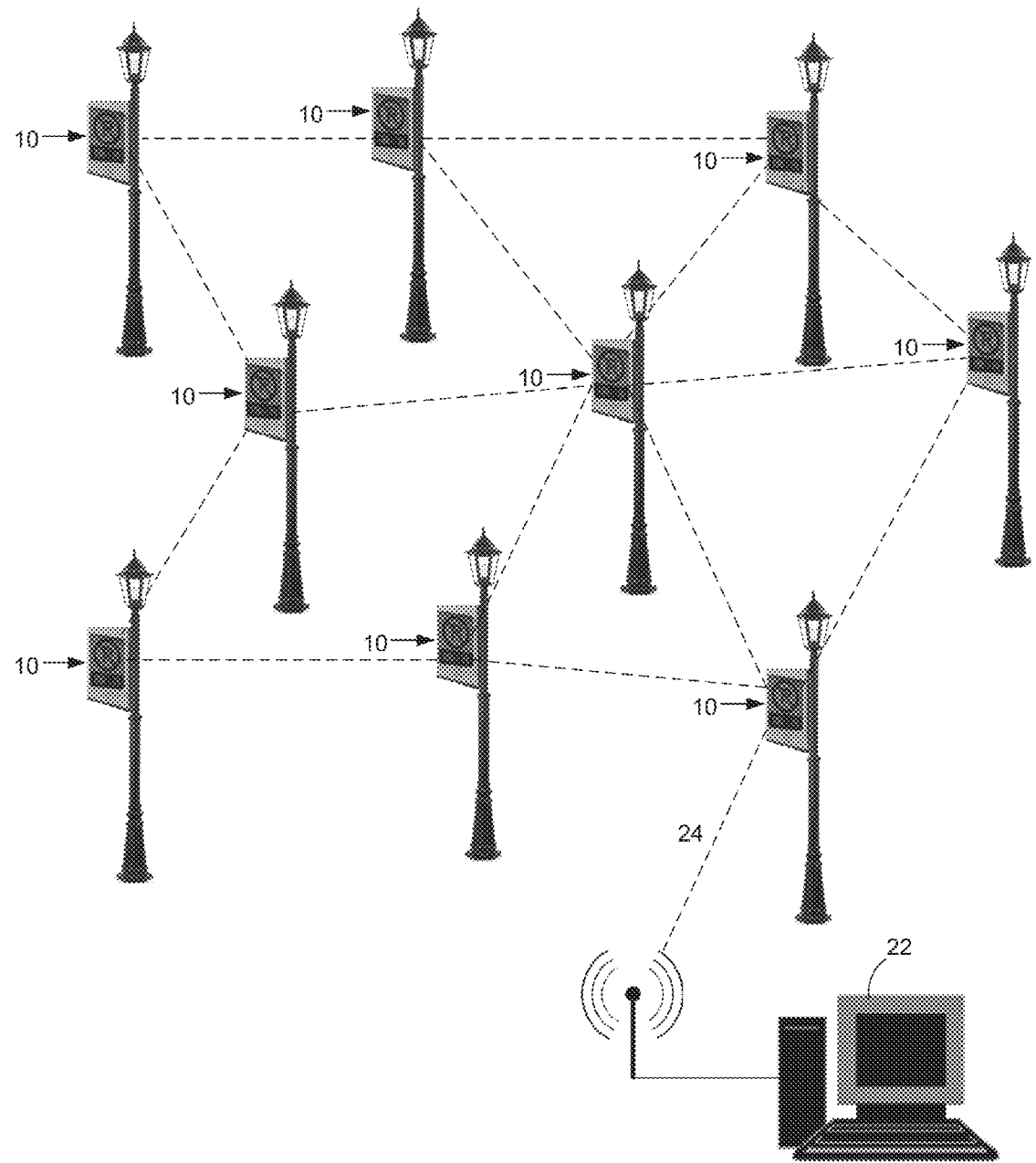
FIG. 4 illustrates electronic placards forming a mesh network, in accordance with an embodiment.

As shown in FIG. 4, the traffic information may be provided to one or more electronic placards from a central station 22 e.g., a computer, server or the like. The station 22 may be connected to one or more placards 10 over a communication link 24 e.g. any type of wired and/or wireless link (RF, cellular, Bluetooth, Infrared, etc.). In one embodiment, the central station 22 may be accessed remotely over another communication network such as the internet, or a wireless network whereby users may access the station 22 to send traffic information to the placards 10 from their cellular phones or computing devices from any location in the world.

According to another embodiment, the traffic information may be provided to one or more electronic placards from a roaming and/or portable station/device which may be installed within a vehicle which travels the streets where the electronic placards are installed. The roaming station has a unique ID which makes it easy for the placards 10 to carry out instructions based on the recognition of the roaming station ID. In the case, where snow removal is involved, the roaming station could be in the snow removal vehicle. The electronic placards would simply detect the proximity of the roaming station and update its traffic message based on this detection. According to an embodiment, the roaming station may be a simple remote keypad (not shown), also with a unique ID. The remote keypad can be used to transmit instructions to the placards 10 and thereby controls information being displayed thereon.

Figure 5A:
FIG. 5a illustrates the placards on a map/interface, in accordance with an embodiment.
Figure 5B:
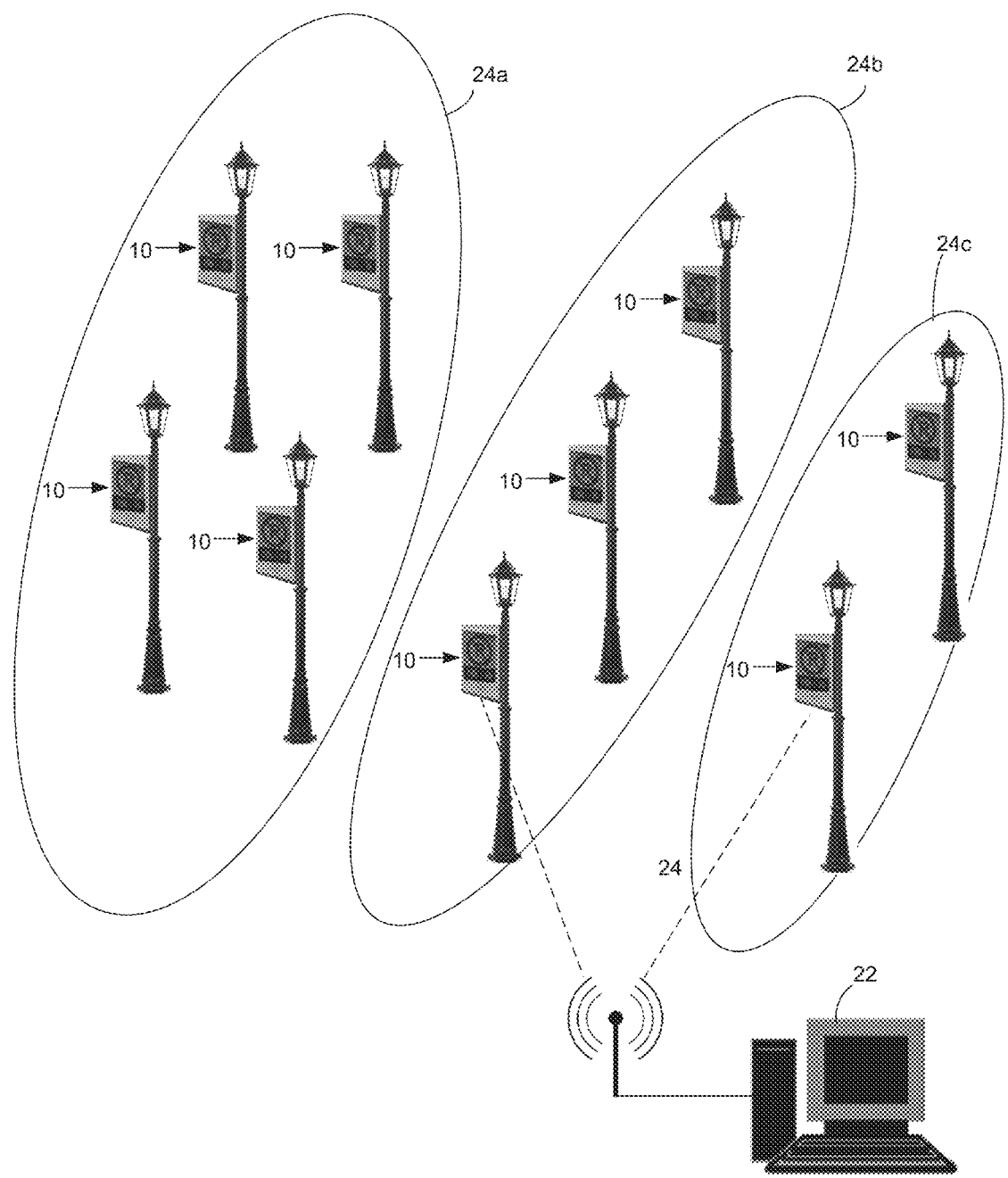
FIG. 5b illustrates the electronic placards of FIG. 4 divided in groups, in accordance with an embodiment.

In a non-limiting example of implementation, each placard 10 may have a unique ID within the network, whereby it is possible to send unique messages to selected placards 10. For example, a map/user interface may be provided at the central station (or may be accessed remotely over the web) showing the location and identification of each placard 10 in a certain area, as shown in FIG. 5a. In an embodiment, the placards 10 may be grouped by areas or sub-areas, street names, etc. as shown in FIG. 5b, whereby it is possible to send a message indicating "no-parking between 6 PM and 7 PM" to placards 10 in group 24a, a message indicating "no-parking between 7 PM and 8 PM" to placards in group 24b, and another indicating "Parking Permitted" to placards 10 in group 24c. The interface allows the user to view the placards and select one or more placards and send them a traffic message overriding the previously displayed one.

In an embodiment, the placards 10 may include a positioning system such as a GPS for locating them on any map.

Figure 6:
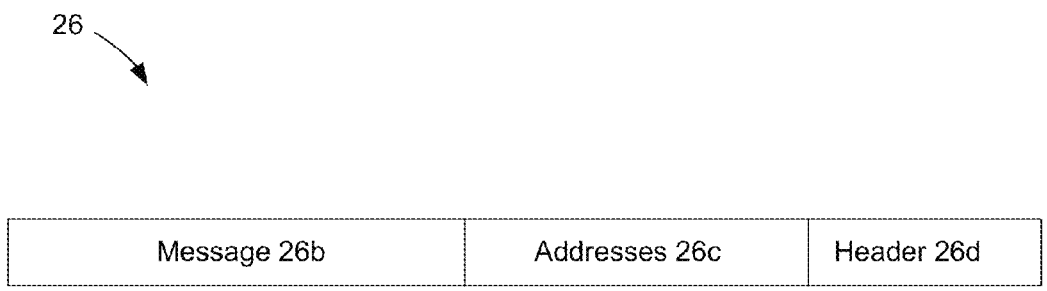
FIG. 6 illustrates an example of a message word.

In an embodiment, the electronic information sent by the central station 22 is encapsulated in a message word 26. An example of a message word 26 is shown in FIG. 6. In a non-limiting example of implementation, the message word 26 may include a portion 26b indicating the message to be displayed on selected placards, a portion 26c including the IDs of one or more placards 10 to which the message is intended, and a portion 26d including a header comprising security information and redundancy check. In an embodiment, the portion 26s may include coded information that may only be decoded using the unique IDs of the placards to which the message is intended.

In a non-limiting example of implementation, the ID (or address) of the destination placard may be used for the encoding/decoding the message word at the head station 22. For example, the message 26b destined to a given placard 10 may be encoded such that the message may only be decoded using the ID of the destination placard 10. Several encoding methods may be used for the encoding. In another embodiment, it is possible to use methods that allow for sending a message that may be decoded by more than one designated placards. For example, if there are four placards A, B, C, and D in a given area and the user wants to send the same message to placards A and C, but not B and D, the message word may be encoded to be decoded by placards A and C only using the IDs of these placards.

Figure 7:
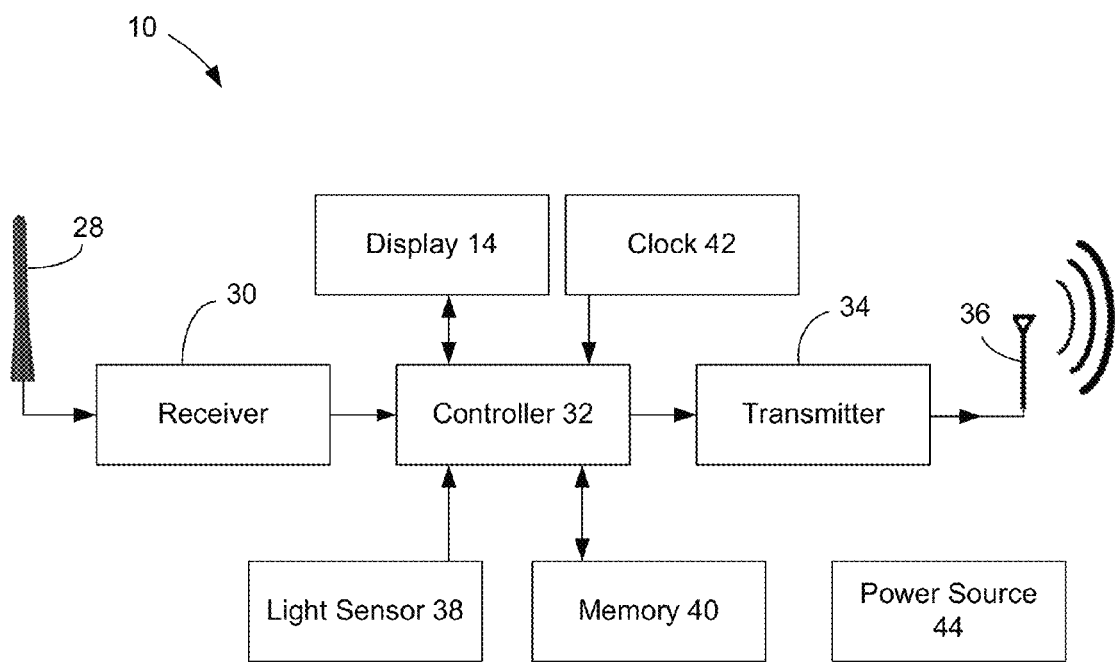
FIG. 7 is a block diagram illustrating the main modules of an exemplary electronic placard in accordance with an embodiment.

FIG. 7 is a block diagram illustrating the main modules of an exemplary electronic placard in accordance with an embodiment. As shown in FIG. 7, the electronic placard 10 may include an antenna for receiving the information from neighboring electronic placards 10 or the central station 22, a receiver 30 for analyzing and decoding the signal received from the antenna 28, a controller e.g. processor or microprocessor etc., for analyzing the message word 26 received from the receiver 30 and to determine whether the message word 26 is intended to the subject placard 10. The controller may also be configured to repair the message word when possible. The display 14 is connected to the display 14 for displaying the new message if the message is intended to the subject placard. The placard may also include a transmitter 34 for propagating the message word to other placards using the transmitter 36.

In an embodiment, the placard 10 may include a light sensor 38 connected to the controller 32 for detecting the intensity of the light and adjusting the intensity of the power in the LEDs of the display 14 accordingly.

It should be noted that obvious modifications may be done to the configuration shown in FIG. 7. For example, it is possible to combine or divide some of the components shown in the block diagrams. For instance, it is possible to use a transceiver instead of a separate receiver 30 and transmitter 34. In other instances, it is possible to use the same antenna for transmission and reception etc.

Figure 8:
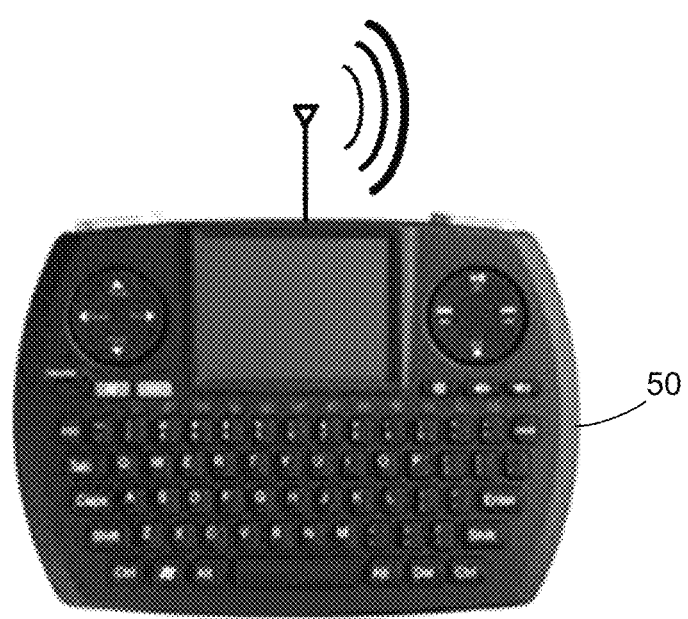
FIG. 8 illustrates an example of a remote controller for changing messages displayed in the electronic placard from a short distance.

In an embodiment, a short range remote controller 50 (shown in FIG. 8) may be used which allows for changing/overriding the message displayed on a given placard 10 from short distances e.g. 10 to 20 meters or less. Such remote controller may be provided in vehicles that perform functions within the network such as for example, vehicles that perform snow removal or the like. Whereby, the operator of such vehicles may manually display a given message e.g. prohibiting the parking or prolonging the NO-Parking time until snow has been removed, or changing the NO-Parking message to Parking Permitted if the snow removal is done earlier or the like.

In the present scenario, the message word sent by the remote controller 50 may be encoded in a manner that gets decoded by any receiving placard regardless of the address of the placard in the network.

The placard 10 may be adapted to record one of more of: the ID of the remote controller 50, the message displayed, and the time stamps associated with the activities associated with the remote controller and report this back to the head station 22 for record keeping purposes, billing, insurance claims and the like. For example, such information may be necessary for determining the punctuality of the snow removal, billing, and to determine the parties responsible for damages and accidents occurring during the snow removal. In a further embodiment, the placard 10 may be adapted to sense (using a short range sensor/receiver which may be embedded within the receiver module 30) the presence of the remote controller 50 within a short range and report the ID of that controller 50 back to the head station 22 regardless of whether the controller was used to change the message of that placard 10 or not.

The placard 10 may be powered using a power source which may include an internal and/or external battery and/or solar panel, and/or may be directly connected to an external power source such as the existing electric current in the pole. Other standard power equipments such as a power converter may also be included in the placard 10. In an embodiment, the placard may be implemented to operate using a wide range of voltages and a wide range of temperatures to not be affected by extreme whether conditions.

In an embodiment, the display 14 may include, an LDC monitor, multicolor LEDs, or any suitable display technology which allows the display 14 to display traffic signs, text, rotating text, icons, symbols, etc. in a continuous, scrolling or flashing manner (and/off).

In an embodiment, the electronic placard 10 may include a memory 40 and an inner clock 42. The memory may include statements and instructions for processing by the controller. The inner clock 42 may be used by the controller 32 for knowing the time, whereby, the placard 10 may work independently/autonomously as a regular placard until propagated information is received from the central station to switch the placard from autonomous mode to controlled mode. This is particularly important when unforeseen events happen, such as construction, accident, special event, changes in the snow removal schedule etc.

Illustrative Operating Environment

The embodiments may take the form of an entirely hardware embodiment, an entirely software embodiment, an embodiment combining software and hardware aspects, and/or a user interface etc. For example, a user interface may be provided at the central station 22 for selecting one or more placards 10 and sending a traffic message thereto. Furthermore, the central station 22 may be operably connected to one or more servers locally or in the cloud for storing information received from the individual placards.

Furthermore, the remote controller device 50 may include a dedicated device and may also be implemented using a mobile device, an IPOD, laptops, desktops, tablets or any computing device having sufficient computing and/or communication resources to implement the embodiments.

Figure 9:
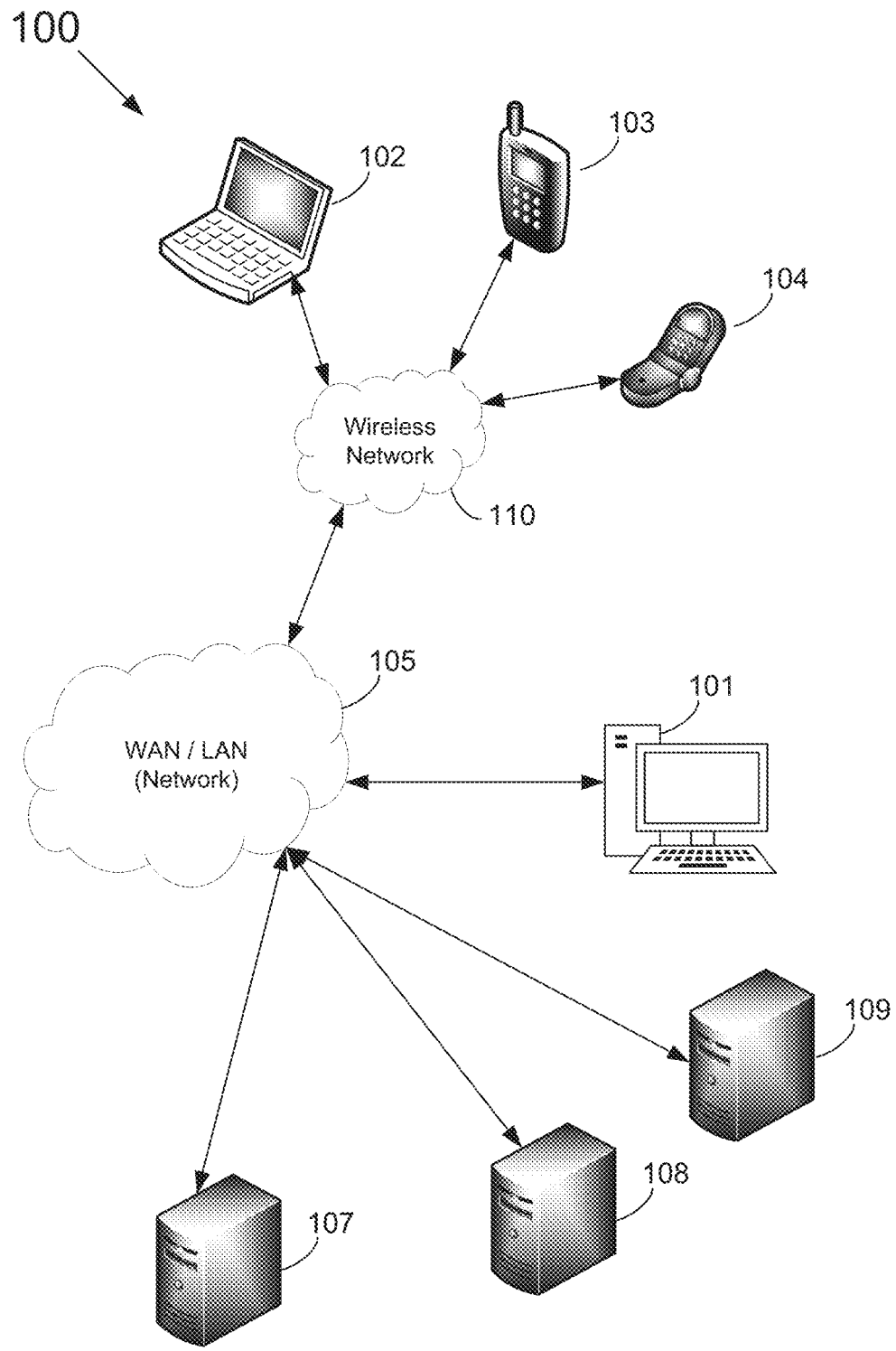
FIG. 9 shows components of one embodiment of an environment in which the embodiments may be practiced.

FIG. 9 shows components of one embodiment of an environment in which the embodiments may be practiced. Not all the components may be required to practice the embodiments, and variations in the arrangement and type of the components may be made without departing from the spirit or scope of the invention. As shown, system 100 of FIG. 9 includes local area networks ("LANs")/wide area networks ("WANs")—(network) 105, wireless network 110, mobile devices (client devices) 102-104, client device 101, and content servers 107-109.

Generally, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, a device of the IPOD or IPAD family of devices manufactured by Apple Computer, integrated devices combining one or more of the preceding devices, or any other computing device capable of performing the methods and systems described herein. Client device 101 may also include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, and several lines of color LCD display in which both text and graphics may be displayed. It should be understood, however, that the client device may also include one or more other physical user interface devices, such as a physical keyboard, a mouse etc.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send information.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, SMS, MMS, IM, IRC, mIRC, Jabber, or the like, between another computing device. However, the present invention is not limited to these message protocols, and virtually any other message protocol may be employed.

The client devices 101-104 may be adapted to connect with one or more of servers 107-109 to receive executable codes and programs (aka applications) and for updating some of the existing applications and content stored on the client devices 101-104.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, Wi-Fi network, or the like. Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple content servers 107-109, and client device 101 with other computing devices, including through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Content servers 107-109 include virtually any network device that is configured to provide content over a network to another computing device.

In particular, content servers 107-109 may host a variety of social networking sites, including, but not limited to Flicker, Twitter, Facebook, LinkedIn, personal user sites, such as blogs, vlogs, online dating sites, and so forth. Content servers 107-109 may also host a variety of non-social networking sites, including, but not limited, to various business sites, educational sites, dictionary sites, encyclopedia type sites, financial sites, government sites, and the like. Content servers 107-109 may further provide a variety of services that include, but are not limited to web services, third-party services, audio services, video services, email services, IM services, SMS services, VOIP services, calendaring services, photo services, or the like. Content may include web content, audio content, video content, FTP data, or the like. Devices that may operate as content server 107 include personal computers desktop computers, multiprocessor systems, microprocessor-based or programmable consumer electronics, network PCs, servers, and the like.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. An electronic placard comprising:
    a display;
    a memory having recoded thereon an address representing a unique identification of the electronic placard in a network of placards;
    a transceiver adapted to receive a message word including an encoded traffic message from a central station over said network of electronic placards and wirelessly propagate the received message word to adjacent electronic placards in a point-to-multipoint configuration; and a controller adapted to attempt decoding the message word using the unique identification to extract the traffic message, and if successfully extracted send the extracted traffic message to the display for overriding the traffic message previously displayed on the display;

whereby only designated electronic placards may decode the message word to display it;

wherein the electronic placard is adapted to:
- detect a remote controller within a predetermined short distance and detect an ID of the remote controller;
- receive message words from the remote controller, extract the traffic message from the received message words and display the traffic messages on the display;
- decode any message word sent by the remote controller regardless of the unique identifier of each electronic placard.

2. The electronic placard of claim 1, wherein, in the absence of message words from the central station the electronic placard is adapted to display predefined traffic messages in accordance with a pre-programmed schedule.

3. The electronic placard of claim 1, wherein the placard is further adapted to forward at least one of: the message included in the message word received by the remote controller, a timestamp associated with the detection of the remote controller within the short distance within the electronic placard, and a timestamp associated with the message word received from the remote controller.

4. The electronic placard of claim 1, further comprising an attachment for securing the electronic placard to a pole.

5. The electronic placard of claim 4, wherein the attachment defines a circular clamp.

6. The electronic placard of claim 1, wherein the electronic placard is dimensioned to be portable.

7. A system for displaying updated traffic information in a given location, said system comprising:
- a plurality of electronic placards, each electronic placard being provided in a specific location and having a unique identifier, wherein each electronic placard comprises a transceiver for receiving and re-transmitting a message word to adjacent electronic placards, and a display for displaying a traffic message encoded in the message word;
- a central station adapted to encode and send the message word including an updated traffic message designated to selected electronic placards over a telecommunications network;
- wherein each electronic placard re-transmits the received message word to adjacent placards in a point-to-multipoint configuration; and
- wherein the traffic message is encoded in the message word such that only the designated electronic placards may decode the message and display it;

wherein one or more electronic placards are adapted to:
- detect a remote controller within a predetermined short distance and detect an ID of the remote controller;
- forward the ID of the remote controller to the central station;
- receive message words including traffic messages from the remote controller and decode and display the traffic messages included in the message words sent by the remote controller; and
- decode any message word sent by the remote controller regardless of the unique identifier of each placard.

8. The system of claim 7, wherein the electronic placards are dimensioned to be portable.

9. The system of claim 8, wherein each electronic placard comprises an attachment for securing the placard to a pole.

10. The system of claim 7, wherein, in the absence of message words from the central station the electronic placards display predefined traffic messages in accordance with a pre-programmed schedule.

11. An electronic placard for displaying an updated traffic message in a given area, the electronic placard comprising:
- a chassis that is dimensioned to be portable;
- an attachment for attaching said chassis to an elevated structure for making the electronic placard visible to pedestrians and drivers;
- an electronic display;
- a memory having recoded thereon an address representing a unique identification of the electronic placard in a network of electronic placards;
- a transceiver adapted to receive a message word including an encoded traffic message from a central station over said network of electronic placards and wirelessly propagate the received message word to adjacent electronic placards in a point-to-multipoint configuration; and
- a controller adapted to attempt decoding the message word using the unique identification to extract the traffic message for overriding a previously displayed message, whereby the updated traffic message may be decoded by designated electronic placards in the given area;

wherein the electronic placard is adapted to:
- detect a remote controller within a predetermined short distance and detect an ID of the remote controller;
- receive message words from the remote controller, extract the traffic message from the received message words and display the traffic messages on the electronic display;
- decode any message word sent by the remote controller regardless of the unique identifier of each electronic placard.

* * * * *